United States Patent
Blümel

(10) Patent No.: US 7,202,572 B2
(45) Date of Patent: Apr. 10, 2007

(54) GENERATOR/MOTOR SYSTEM AND METHOD OF OPERATING SAID SYSTEM

(75) Inventor: Roland Blümel, Stuttgart-Plieningen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/522,908

(22) PCT Filed: Jul. 16, 2003

(86) PCT No.: PCT/EP03/07698

§ 371 (c)(1),
(2), (4) Date: Jul. 20, 2005

(87) PCT Pub. No.: WO2004/013953

PCT Pub. Date: Feb. 12, 2004

(65) Prior Publication Data
US 2005/0253395 A1    Nov. 17, 2005

(30) Foreign Application Priority Data
Jul. 30, 2002   (DE) ............................... 102 34 594

(51) Int. Cl.
*H02P 9/00*   (2006.01)
*H02P 9/30*   (2006.01)
(52) U.S. Cl. .................... 290/37 R; 290/40 C
(58) Field of Classification Search .................... None
See application file for complete search history.

(56) References Cited

U.S. PATENT DOCUMENTS 3,612,973 A * 10/1971 Kuniyoshi .................. 318/254
4,024,456 A   5/1977 Sato et al.
5,998,976 A * 12/1999 Steffan ....................... 322/10
6,049,149 A * 4/2000 Lin et al. .................. 310/68 R (Continued)

FOREIGN PATENT DOCUMENTS

DE    2118703 A * 11/1971

(Continued)

OTHER PUBLICATIONS

Osama, Mohamed et al., "Modeling and Analysis of a Wide-Speed-Range Induction Motor Drive Based on Electronic Pole Changing", *IEEE Transactions on Industry Applications*, vol. 33, No. 5, Sep./Oct. 1997, pp. 1177-1184.

(Continued)

*Primary Examiner*—Joseph Waks
(74) *Attorney, Agent, or Firm*—Norman N. Kunitz; Fitch, Even, Tabin & Flannery

(57) ABSTRACT

A generator/motor system and a method for operating this generator/motor system with which the filter currents are reduced. The generator/motor system has, for this purpose, a rotational field machine (DM) and a pulse-controlled inverter and filter capacitors (C1, C2). The pulse-controlled inverter is formed by two identical pulse-controlled inverters (PWR1, PWR2) which each have half the rated power. During operation, depending on the necessary rotational speed switching over is performed between a star circuit in which only the first pulse-controlled inverter is operational, and a single phase circuit in which both pulse-controlled inverters are operational. In order to obtain a torque which is comparable to the prior art, even if only one of the two pulse-controlled inverters is used, the rotational field machine has approximately twice the number of stator turns.

10 Claims, 3 Drawing Sheets

U.S. PATENT DOCUMENTS

| | | | |
|---|---|---|---|
| 6,437,996 B1 * | 8/2002 | Wobben | 363/37 |
| 6,445,157 B2 * | 9/2002 | Lang et al. | 318/771 |
| 6,958,549 B2 * | 10/2005 | Wakitani et al. | 290/40 C |
| 7,009,311 B1 * | 3/2006 | Sriram | 290/36 R |
| 2004/0104700 A1 * | 6/2004 | Edelson | 318/437 |

FOREIGN PATENT DOCUMENTS

| | | |
|---|---|---|
| DE | 34 32 127 A | 3/1985 |
| DE | 199 31 010 A1 | 11/2000 |
| EP | 1048845 A1 * | 11/2000 |
| EP | 1283595 A2 * | 2/2003 |
| GB | 1 342 930 | 1/1974 |
| JP | 02084038 A * | 3/1990 |
| JP | 04197058 A * | 7/1992 |
| JP | 05 122997 A | 5/1993 |
| JP | 2000092878 A * | 3/2000 |
| WO | WO 2005029679 A1 * | 3/2005 |

OTHER PUBLICATIONS

Sack, Lothar, "Reduction of Losses in the DC Link Capacitor of Two-Stage Self-Commutated Converters", Proceedings of the EPE 1999, Lausanne, Switzerland, 8 pages.

Patent Abstracts of Japan, vol. 017, No. 501 (E-1429), Sep. 9, 1993.

* cited by examiner

US 7,202,572 B2

GENERATOR/MOTOR SYSTEM AND METHOD OF OPERATING SAID SYSTEM

CROSS REFERENCE TO RELATED APPLICATION

This application is the National Stage filing under 35 U.S.C. 371 of International Application No. PCT/EP03/07698, filed Jul. 16, 2003, and claims the priority of German Patent application No. DE 102 34 594, filed Jul. 30, 2002.

BACKGROUND OF THE INVENTION

The invention relates to a generator/motor system, in particular for application in mobile units, motor vehicles, ships and the like as an on-board power system generator and starter, of the type having a rotational field machine with three generator phase windings and a pulse-controlled inverter that has a predetermined maximum power and is connected to the three generator phase windings of the rotational field machine. The present invention also relates to a method for operating this generator/motor.

At present, efforts are being made in motor vehicles with an internal combustion engine to combine the starter and generator to form a single electric machine.

However, during these efforts there is a problem, even at the general design stage, that two completely contradictory requirements have to be met.

On the one hand, in order to start and speed up an internal combustion engine it is necessary to apply an extremely high turning torque. This torque may be, depending on the engine capacity or cylinder number of the internal combustion engine, greater than 240 Nm. Furthermore, the electric machine must also be able to provide torque reserves for speeding up the internal combustion engine to the starting speed.

On the other hand, after the internal combustion engine has been successfully started, the electric machine which is designed as a starter/generator should operate predominantly as a generator in order to feed into the on-board power system of the motor vehicle. In this context, there is a need for a constant output of power over the extremely spread out rotational speed range, predefined by the internal combustion engine, from 600 to 6000 1/min (motor) with the highest possible efficiency.

It is virtually impossible to meet both requirements economically with a standard drive composed of a three-phase rotational field machine 30 and voltage-impressing pulse-controlled inverter (PRW) 31 in a rotational field bridge circuit with filter capacitor C, as shown in FIG. 3A.

A problem which it is necessary to overcome in this context is the necessary miniaturization and complete integration of the power electronics. The necessary filter capacitors are an impediment to integration. In particular, given the relatively low on-board power system voltage of 42 V, phase currents of approximately 1200 A in asynchronous machines are currently under discussion in order to generate the starting torques which are required. The intermediate circuit capacitors C, such as are shown, for example, in FIG. 3A which shows the design of a conventional drive system with rotational field machine 30, pulse-controlled inverter 31 and intermediate circuit capacitor C, assume considerable dimensions in this context, and these dimensions are an impediment to integration.

Furthermore, first measurements in the absorber space have shown that it is not possible to make any compromises here. The filtering is necessary in order to fulfill the stringent EMC requirements in motor vehicles. It is imperative to reduce the currents of the machine and thus the filter currents while keeping the other properties of the drive the same.

The configuration of the drive system with a rotational field machine and pulse-controlled inverter is conventionally as follows, described with reference to FIG. 3B.

FIG. 3B shows a conventional rotational speed/torque characteristic. The continuous line in FIG. 3B shows what can be achieved with a specific configuration of the rotational field machine and an associated pulse-controlled inverter power.

If, for example, the starting torque is to be increased while retaining the standard pulse-controlled inverter topology, i.e. one pulse-controlled inverter in a six pulse bridge circuit, and retaining the pulse-controlled inverter (apparent) power, the winding of the rotational field machine must be correspondingly changed. In the simplest case, more turns with thinner wires are formed. This leads to the characteristic curve shown by dashed lines in FIG. 3B. It is apparent that although this measure can increase the starting torque with an unchanged pulse-controlled inverter power, this can only be achieved at the cost of the generator power at relatively high rotational speeds. The configuration point drops correspondingly. Owing to the relatively high number of turns, the rotational field machine reaches its field weakening mode, i.e. the modulation limit of the pulse-controlled inverter, earlier and is able to output less power later during the generator mode.

In particular in motor vehicle applications, and specifically starter/generator arrangements, the costs for the pulse-controlled inverter also play a decisive role. The costs of a pulse-controlled inverter are nowadays no longer assessed very much according to the current strength which the pulse-controlled inverter has to bear but rather according to the current strength which has to be commutated in the topology. This characteristic variable determines the filter expenditure which has to be made particularly in the especially EMC-sensitive field of the car industry. In addition, the filters are an impediment to miniaturization, as are in particular also the reliability problems at high temperatures. For this reason it is necessary to attempt to configure the power electronics in the drive circuit as efficiently as possible, in particular to reduce the currents to be commutated.

M. Osama, T. A. Lipo "Modeling and analysis of a wide-speed-range induction motor drive based on electronic pole changing", IEEE Transactions on Industry Application, Vol. 33, No. 5, September/October 1997 describes a rotational field machine with poles which can be switched over, two winding systems and two separate pulse-controlled inverters. However, less than optimum winding factors are obtained with the specific combination of the winding systems so that the rotational field machine cannot convert the maximum possible pulse-controlled inverter current for a given overall size of the pulse-controlled inverter into the torque in an optimum way. The dynamic behavior when the rotational field machine is switched over is not possible without corresponding torque transient effects, which can throw up particular problems in the drive phase, which can adversely affect the user's comfort. The Dahlander circuit which has also been known for a long time has a similar problem.

In DE 199 31 010 A1, a so-called diode-clamp double-three-level converter, which is known per se, is actuated by a novel pulse method in such a way that a parallel/serial switchover of the two winding systems can be brought about. At the same time, the number of poles of the rotational field machine can be retained during switching over.

Since the switching over is brought about by a different predefinition of the voltage vectors, the switching over also takes place with little noise and without torque transient effects. In addition, the winding systems can also be "pivoted" in their phase so that a further significant reduction in the intermediate circuit current to be filtered can be brought about. Although this system is most developed technically, it is very complicated and costly.

For this reason, a system with a feed power converter and a machine power converter, that is to say a genuine converter, would be more suitable since then a higher degree of flexibility can be achieved. Such a genuine converter is described, for example, in L. Sack, "Reduction of losses in the DC-link capacitor of two-stage self-commutated converters", Proceedings of the EPE '99, Lausanne, Switzerland. In said document it is also possible to achieve a significant reduction in the ripple current to be filtered by synchronizing the pulse patterns. If it is possible to reduce the ripple currents, the efficiency of the system can also be increased simultaneously since a relatively large amount of energy at the feed power inverter of the capacitor is conventionally also converted into dissipated energy.

For this reason, the object of the present invention is to construct a generator/motor system and a method for operating this motor/generator system in which and with which the currents which are to be commutated in the pulse-controlled inverter can be significantly reduced in a simple and cost-effective way.

SUMMARY OF THE INVENTION

This object is generally achieved according to a first aspect of the invention by a generator/motor system of the type originally mentioned above wherein: the pulse-controlled inverter is divided into a first and a second pulse-controlled inverter which are identical to one another and which have half the maximum power; the first and second pulse-controlled inverters each have three branch pairs, with each of the three branch pairs being connected to an associated winding of the three generator phase windings and being composed of at least two symmetrically arranged electronic branch switches which are located in series with one another in the same direction, and with the branch pairs being connected to a d.c. voltage source via the branch switches; the generator phase windings are each connected between respective center points of the associated branch pairs of both pulse controlled inverters; in each case a filter capacitor is connected in parallel with the branch pairs of the first and second pulse-controlled inverters: and an electronic switch is connected in parallel with the generator phase windings between the first pulse-controlled inverter and the second pulse-controlled inverter and via which a positive busbar of the first pulse-controlled inverters can be connected and disconnected from a positive busbar of the second pulse controlled inverter and from a positive pole of the d.c. voltage source.

The above object is generally achieved according to a second aspect of the invention by a method for operating the generator/motor system according to the invention including operating the generator/motor system in a star circuit by keeping closed the branch switches arranged on the side of the positive pole of the d.c. voltage source of the first pulse-controlled inverter (PWR1) and keeping open both the branch switches which are arranged on the side of the negative pole of the d.c. voltage source of the first pulse-controlled inverter and the electronic switch as well as actuating all the branch switches of the second pulse-controlled inverter to operate the generator/motor system;
sensing the rotational speed of the rotational field machine and determining a characteristic-diagram-dependent switchover point;
switching over the generator/motor system at the determined switchover point to operation in the single phase circuit by closing the electronic switch and actuating the both pulse-controlled inverters such that each generator phase winding receives its own H bridge. i.e. by all the branch switches of the first and second pulse-controlled inverter being closed.

It is advantageous in particular that by dividing the pulse-controlled inverter into two identical pulse-controlled inverters with half the rated power each it becomes possible to operate the generator/motor system both in a star circuit and in a single phase circuit and as a result to obtain uniform current loading of the filter over a wide range. As a result, both a peak current during starting and a configuration of the filter to this peak load are avoided since in the star circuit only approximately half the conventional phase currents have to be commutated.

This, and further objects, advantages and features of the invention, become apparent from the following description of a preferred exemplary embodiment in conjunction with the drawing, in which:

DETAILED DESCRIPTION OF THE INVENTION

Figure 1:
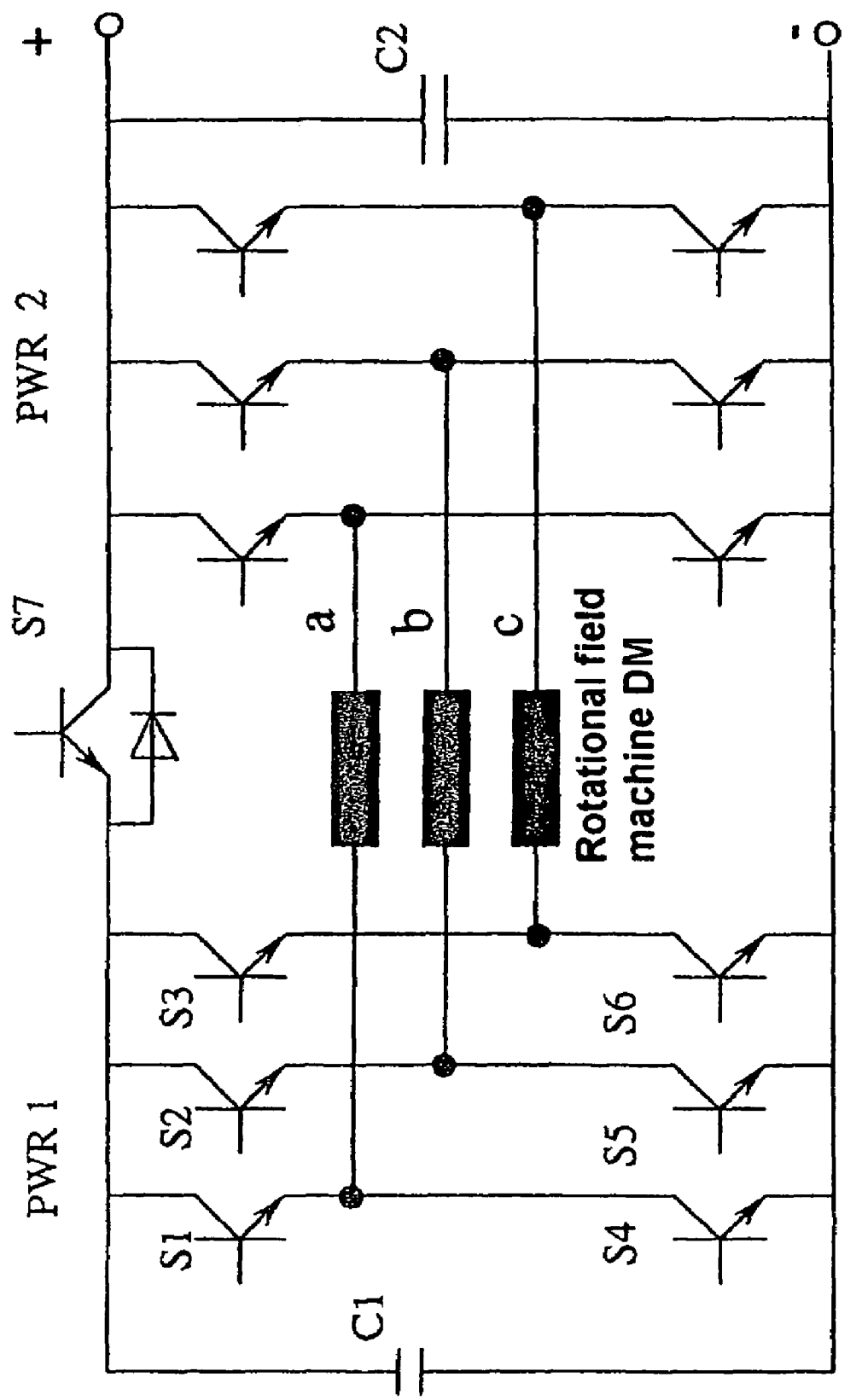
FIG. 1 is a circuit diagram of a generator/motor system according to the invention.

FIG. 1 shows a circuit diagram of a generator/motor system according to the invention. The generator/motor system according to the invention has a three phase rotational field machine DM whose individual generator phase windings or machine phases a, b and c are connected to a first and second pulse-controlled inverter PWR1 and PWR2. The first and second pulse-controlled inverters PWR1 and PWR2 are of identical design and have the same rated power. Each pulse-controlled inverter PWR1 and PWR2 is composed of six electronic branch switches S1 to S6 which are formed, for example, by MOS transistors or IGBT (Integrated Gate Bipolar Transistors) and are arranged symmetrically in series in three branch pairs, and of a filter capacitor C1 and C2 which are connected in parallel with the pulse-controlled inverter. As a result of the division into the first and second pulse-controlled inverters PWR1 and PWR2 it is possible to select significantly smaller capacitors for these filter capacitors C1 and C2, which have an advantageous effect on overall size and power loss.

Between the two pulse-controlled inverters PWR1 and PWR2, an electronic switch S7, via which a positive busbar of the first pulse-controlled inverter PWR1 can be connected to the positive busbar of the second pulse-controlled inverter PWR2, and disconnected from it, is formed in parallel with the machine phases a, b, c. This electronic switch S7 can, but does not need to, be bidirectional. A power MOS transistor with a parasitic reverse-biased diode can be used as a nonbidirectional switch for the switch S7.

The method of operation of the generator/motor system according to the invention will now be explained below with reference to FIG. 1.

The generator/motor system according to the invention permits two different operating modes.

1. Operation with a Star Circuit

In a star circuit the branch switches S1, S2 and S3 are closed and the branch switches S4, S5 and S6 as well as the electronic switch S7 are open. The pulse-controlled inverter PWR1 thus forms a star point for the three machine phases a, b and c which are represented. In voltage-impressing pulse-controlled inverters PWR1 and PWR2 in a six pulse bridge circuit, the potential of the star point jumps between ⅓ and ⅔ of the voltage of the intermediate circuit as a function of the switched-on voltage vectors. If the switches are composed of MOSs the reverse-biased diode does not need to be activated.

Figure 2:
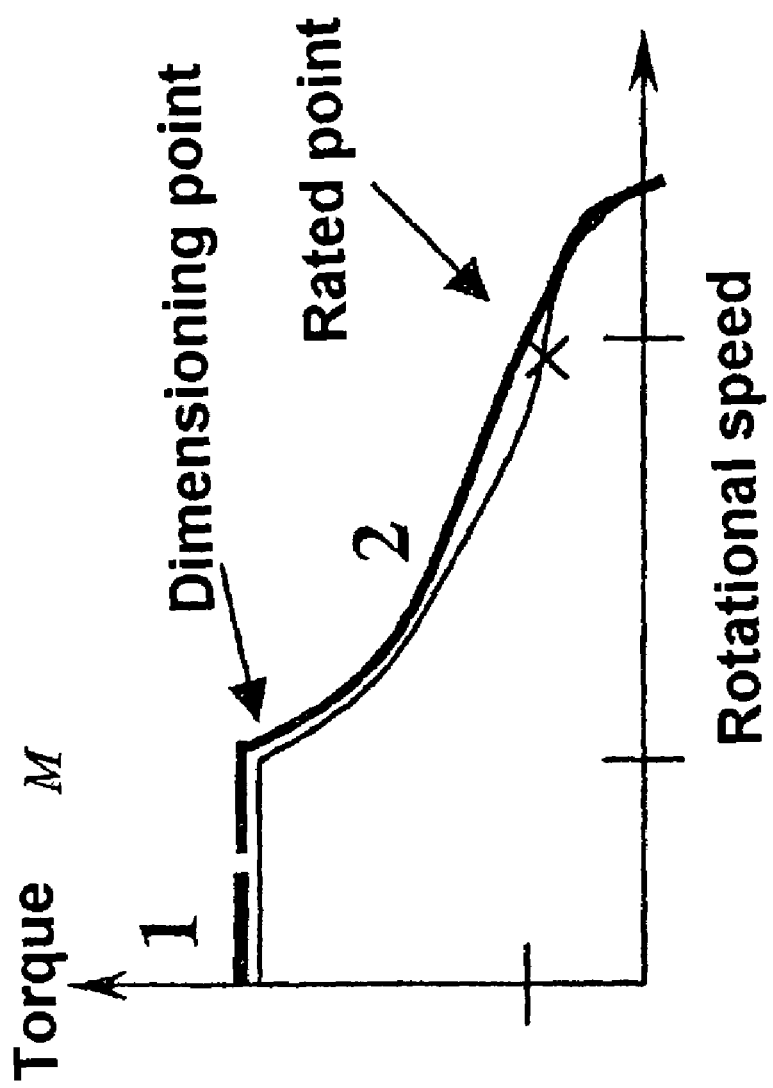
FIG. 2 is a torque/rotational speed characteristic of a conventional generator/motor system and an equivalent torque/rotational speed characteristic of the generator/motor system according to the invention, and FIG. 3, with FIGS. 3A and 3B, shows a conventional drive system and an associated rotational speed/torque characteristic.
Figure 3A:
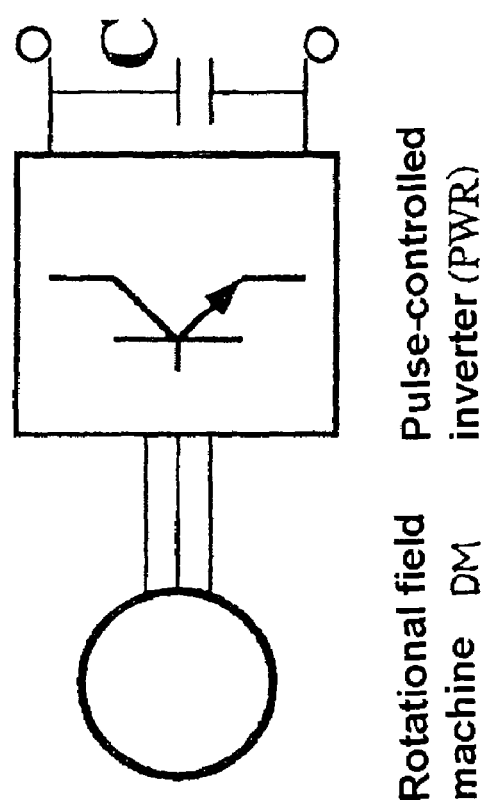
Figure 3B:
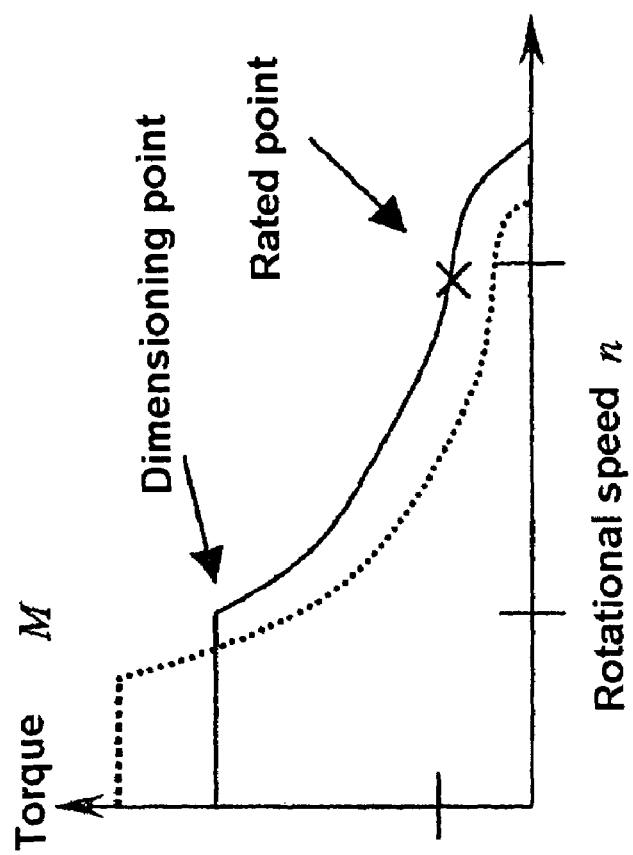

Since, compared with the prior art, only half the pulse-controlled inverter, specifically the pulse-controlled inverter PWR1 is now available for conducting current, the rotational field machine DM acquires more stator turns as compensation for this. The flux linkage, which determines the torque, is thus retained. As a result, the characteristic curve branch 1 in FIG. 2 is obtained. An equally large torque is implemented but since only half the circuit participates in the conversion of energy, specifically the pulse-controlled inverter PWR1, it is also the case that only approximately half the original phase currents have to be commutated. If the same ripple of the intermediate circuit voltage is permitted, the filter expenditure is also approximately halved.

2. Operation with a Single Phase Circuit ("Open Delta")

Of course, owing to the approximately double number of stator turns of the rotational field machine DM, the modulation limit of the pulse-controlled inverter PWR1 is already reached at half the rotational speed in comparison with the standard solution. The star point which is formed by the pulse-controlled inverter PWR1 is then eliminated and the generator/motor system is operated with a single phase circuit. For this purpose, the electronic switch 7 is closed and the pulse-controlled inverter PWR1 is actuated in such a way that each phase receives its own half bridge, i.e. all the branch switches of the first and second pulse-controlled inverter PWR1 and PWR2 are closed. By reducing the terminal voltage to approximately half, the modulation limit of the generator/motor system according to the invention is moved further toward higher rotational speeds. The same dimensioning point is implemented. A characteristic curve branch 2 of the characteristic curve of the generator/motor system according to the invention is then approximately covered with that of one standard circuit.

As a result, the objective is achieved using the switchable generator/motor system according to the invention. By switching over the motor/generator system the current loading of the filter is homogenized over a wide range. The peak current during starting and the configuration of the filter to this peak loading is thus avoided.

Switching over from one operating mode to the other is carried out according to the invention in a way which is optimized in terms of efficiency. Only the maximum characteristics are shown in FIG. 2. With a partial load, a control unit which can be implemented as software module assumes the precise characteristic-diagram-dependent switchover point in a way which is optimized in terms of efficiency.

Since the switching over takes place without an impact, it is in theory possible to switch over as often as possible.

Furthermore, an advantage with the circuit according to the invention is that some of the capacitor quiescent currents can be switched off using the switch S7.

In addition the reliability is increased since the single phase circuit permits operation, however somewhat restricted operation, with asynchronous machines even if an electronic switch in the generator/motor system has a fault, for example short circuit or disconnection). It is then always also possible to build up a rotational field, which is not possible with a standard bridge circuit with three phases.

In addition, the efficiency is increased since the reduction in the ripple currents not only leads to a reduction in the filters overall but also to a reduction in the filter losses.

The invention claimed is:

1. An electric generator/motor system, in particular for application in mobile units, motor vehicles, ships and the like as an on-board power system generator and starter, having:

a rotational field machine with three generator phase windings and a pulse-controlled inverter which has a predetermined maximum power and is connected to the three generator phase windings of the rotational field machine, wherein the pulse-controlled inverter is divided into a first and a second pulse-controlled inverter which are identical to one another and which have half the maximum power, the first and second pulse-controlled inverters each have three branch pairs, each of the three branch pairs is connected to an associated winding of the three generator phase windings and is composed of at least two symmetrically arranged electronic branch switches which are located in series with one another in the same direction, and each branch pair is connected to a d.c. voltage source via the branch switches; wherein the generator phase windings are each connected between respective center points of the associated branch pairs, of both pulse-controlled inverters; wherein in each case a filter capacitor is connected in parallel with the branch pairs of the first and second pulse-controlled inverters; and wherein an electronic switch is connected in parallel with the generator phase windings between the first pulse-controlled inverter and the second pulse-controlled inverter and via which a positive busbar of the first pulse-controlled inverter can be connected and disconnected from a positive busbar of the second pulse-controlled inverter and from a positive pole of the d.c. voltage source.

2. The electric generator/motor system as claimed in claim 1, in that wherein the electronic switch is unidirectional.

3. The electric generator/motor system as claimed in claim 1, wherein the electronic switch is a power MOS transistor with a parasitic reverse-biased diode.

4. The electric generator/motor system as claimed in claim 1, wherein the electronic switch is a bidirectional switch.

5. The electric generator/motor system as claimed in claim 1, wherein the branch switches are power MOS transistors with a parasitic reverse-biased diode.

6. The electric generator/motor system as claimed in claim 1, wherein the rotational field machine has such an increased number of stator turns that when only one pulse-controlled inverter is connected into the circuit it is possible to bring about a flux linkage which corresponds to a flux linkage when the entire pulse-controlled inverter, including the first and second pulse-controlled inverters, is connected into the circuit, without increasing the number of stator turns.

7. The electric generator/motor system as claimed in claim 1, wherein a control unit is provided which under partial load implements a characteristic-diagram-dependent switchover point from a star circuit operating mode into a single phase circuit in a way which is optimized in terms of efficiency.

8. A method for operating a generator/motor system as claimed in claim 1, including the following steps:
  operating the generator/motor system in a star circuit by keeping closed the branch switches arranged on the side of the positive pole of the d.c. voltage source of the first pulse-controlled inverter and keeping open both the branch switches of the first pulse-controlled inverter which are arranged on the side of the negative pole of the d.c. voltage source and the electronic switch, and actuating all the branch switches of the second pulse-controlled inverter in a known manner to operate the generator/motor system;
  sensing the rotational speed of the rotational field machine and determining a characteristic-diagram-dependent switchover point;
  switching over the generator/motor system at the determined switchover point to operation in the single phase circuit by closing the electronic switch and actuating both pulse-controlled inverters in such a way that each generator phase winding receives its own H bridge, by closing all the branch switches of the first and second pulse-controlled inverters.

9. The method as claimed in claim 8, wherein the switchover point is determined in a way which is optimized in terms of efficiency.

10. An electric generator/motor system, in particular for application in mobile units, motor vehicles, ships and the like as an on-board power system generator and starter, having a rotational field machine with three generator phase windings and a pulse-controlled inverter which has a predetermined maximum power and is connected to the three generator phase windings of the rotational field machine; wherein:
  the pulse-controlled inverter is divided into a first and a second pulse-controlled inverter which are identical to one another and which have half the maximum power;
  the first and second pulse-controlled inverters each have three branch pairs;
  each of the three branch pairs of each of the first and second pulse-controlled inverters is connected to an associated winding of the three generator phase windings and is composed of at least two symmetrically arranged electronic branch switches that are connected in series with one another in the same direction;
  each branch pair is connected, via the branch switches, between positive and negative busbars connected to a d.c. voltage source;
  the generator phase windings are each connected between the respective center points of the associated branch pairs in the first and second pulse-controlled inverters;
  a respective filter capacitor is connected in parallel with the branch pairs of the first and second pulse-controlled inverters; and,
  an electronic switch is connected in the positive busbar between portions of the positive busbar in the first pulse-controlled inverter and in the second pulse-controlled inverter so that the portion of the positive busbar in the first pulse-controlled inverter can be connected and disconnected from the portion of the positive busbar in the second pulse-controlled inverter and from the d.c. voltage source.

* * * * *